H. BROWN.
ATTACHMENT FOR SEEDERS.
APPLICATION FILED SEPT. 9, 1909.
947,658.
Patented Jan. 25, 1910.
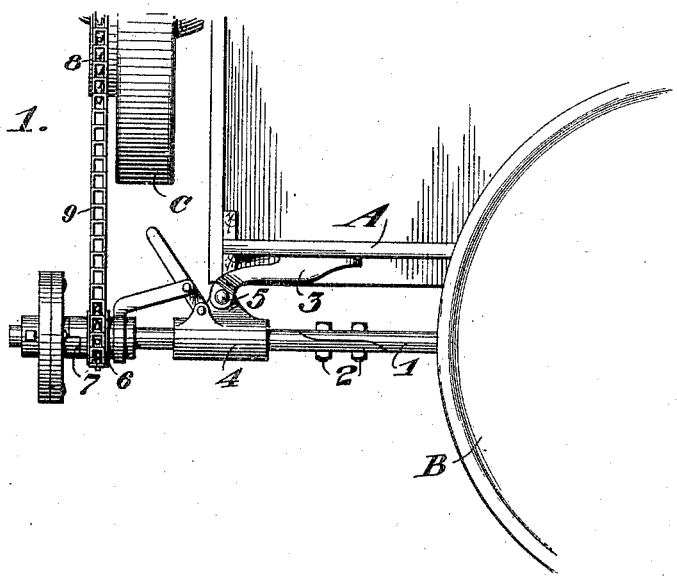
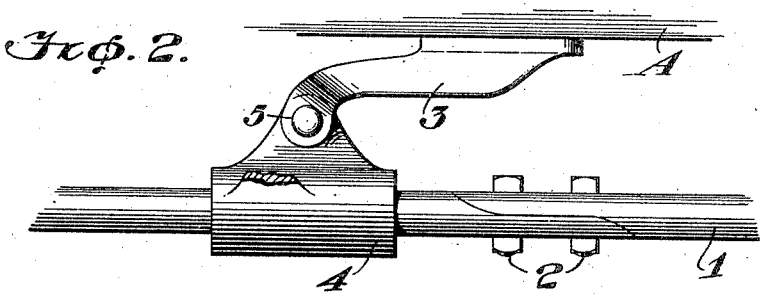
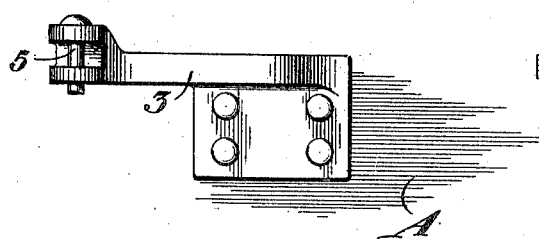
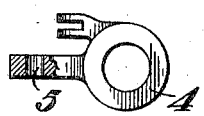

UNITED STATES PATENT OFFICE.

HOWARD BROWN, OF BUFFALO, WYOMING.

ATTACHMENT FOR SEEDERS.

947,658.  Specification of Letters Patent.  Patented Jan. 25, 1910.

Application filed September 9, 1909. Serial No. 516,822.

*To all whom it may concern:*

Be it known that I, HOWARD BROWN, a native-born citizen of the United States, residing at Buffalo, in the county of Johnson and State of Wyoming, have invented certain new and useful Improvements in Attachments for Sowers, of which the following is a specification.

My invention relates to an improvement in an attachment to broadcast seed sowers.

The object is to provide means whereby the chain which connects the driving shaft of the sower with the sprocket wheel on the wheel of the vehicle may be easily removed or applied to the sprocket wheels.

The invention consists of certain novel features of construction and combinations of parts which will be hereinafter described and pointed out in the claims.

In the accompanying drawings: Figure 1 is a top plan view; Fig. 2 is a detailed view of the shaft and supporting arm; Fig. 3 is a detailed view of the supporting arm and bracket and Fig. 4 is an end view of the bracket.

A represents the end board of a wagon upon which is supported the seed sower B. The driving shaft 1, of the sower, is made in two pieces, and the ends of the two sections are connected together by bolts 2, 2. The outer end of the shaft is supported by an arm 3, which is connected to the end board of the wagon. A bracket 4 is provided with an opening therethrough through which the shaft tongue extends, and the bracket is pivotally connected to the arm 3 as at 5. Loosely mounted upon the shaft is a sprocket wheel 6, which is adapted to engage the usual form of clutch 7 for locking the sprocket wheel upon the shaft when it is desired to transmit motion to the shaft and the operative parts of the sower. A wheel C on the wagon is provided with a sprocket wheel 8, over which a chain 9 passes, and the chain extends over the sprocket wheel 6 so that as the wheel C revolves the sprocket wheel 6 is caused to rotate, transmitting motion to the shaft 1.

The operative parts of the sower form no part of my invention and hence I have not described the manner of operation.

The chain 9 is often difficult to place over the two sprocket wheels 6 and 8, the great trouble being that the chain is either too long or too short, and when put on too tight the chain will be broken and when too loose the shaft 1 is not properly operated. To overcome the objection of placing the shaft upon the two sprocket wheels, I have so journaled one section of the shaft 1 that it can be swung outwardly, whereby the chain can be slipped over both sprocket wheels very readily. The shaft can be then swung back into position and be connected up to the other section by the bolts 2. The bracket 4, which is pivotally connected to the arm 3 permits of the outer end of section of the shaft being swung to permit of the chain being placed upon the sprocket wheels or to remove the chain from the sprocket wheels by simply disconnecting the two sections of the shaft 1.

From the foregoing it will be seen that I have provided a very simple means of applying the chain to the sprocket wheels and permitting the chain to be removed at any time for repairs or when it is desired to stop the operation of the sower.

Having fully described my invention what I claim as new and desire to secure by Letters Patent, is:

1. The combination with a vehicle body, of a seed sower mounted thereon having a drive shaft made in sections, one section of the shaft pivotally mounted upon the vehicle body, and means for connecting the two sections of the shaft together.

2. The combination with a wagon body, of a seed sower mounted thereon having a drive shaft made in sections, an arm mounted on the wagon body, a bracket pivotally connected to the arm for supporting one section of the shaft and means connecting the sections of the shaft together.

3. The combination with a vehicle having a body and wheels, a sprocket wheel on one of the wheels, of a seed sower mounted on the vehicle body, having a drive shaft made in sections, an arm connected to the vehicle body pivotally supporting one section of the shaft, means connecting the sections of the shaft together, a sprocket wheel on the shaft and a chain connecting said sprocket wheel and the sprocket wheel on the vehicle wheel.

In testimony whereof I affix my signature, in the presence of two witnesses.

HOWARD BROWN.

Witnesses:
 THOS. D. BEBB,
 ROBT. E. KELLY.